United States Patent
Veschi

(10) Patent No.: US 7,050,426 B2
(45) Date of Patent: May 23, 2006

(54) METHOD AND SYSTEM FOR ROUTING CALLS FROM A STANDARD TELEPHONE DEVICE TO A VOICE OVER INTERNET PROTOCOL NETWORK

(75) Inventor: Robert A. Veschi, Germantown, MD (US)

(73) Assignee: Edgeaccess, Inc., St. Thomas (VG)

( * ) Notice: Subject to any disclaimer, the term of this patent is extended or adjusted under 35 U.S.C. 154(b) by 722 days.

(21) Appl. No.: 09/823,350

(22) Filed: Mar. 29, 2001

(65) Prior Publication Data

US 2001/0028642 A1 Oct. 11, 2001

Related U.S. Application Data

(60) Provisional application No. 60/193,049, filed on Mar. 29, 2000.

(51) Int. Cl.
*H04L 12/66* (2006.01)

(52) U.S. Cl. ...................................... 370/356; 370/463

(58) Field of Classification Search ................ 370/356, 370/352, 353, 401, 463
See application file for complete search history.

(56) References Cited

U.S. PATENT DOCUMENTS

| | | | |
|---|---|---|---|
| 6,351,464 B1* | 2/2002 | Galvin et al. ................ 370/356 |
| 6,434,528 B1* | 8/2002 | Sanders ....................... 704/275 |
| 6,625,139 B1* | 9/2003 | Miloslavsky et al. ........ 370/352 |
| 6,683,871 B1* | 1/2004 | Lee et al. ..................... 370/356 |
| 6,704,294 B1* | 3/2004 | Cruickshank ................ 370/265 |
| 6,751,207 B1* | 6/2004 | Lee et al. ..................... 370/338 |
| 6,826,174 B1* | 11/2004 | Erekson et al. .............. 370/352 |

* cited by examiner

*Primary Examiner*—Min Jung
(74) *Attorney, Agent, or Firm*—Davidson Berquist Jackson & Gowdey, LLP

(57) ABSTRACT

The invention enables accessing and using a Voice over Internet Protocol network, and can use a standard telephone to automatically access a VoIP network. A first aspect of the invention uses an auto dialer to transmit digits, such as a network access number, an account number and a PIN, which remain unchanged from call to call made through a given network service provider. A second aspect of the invention provides a speed dial feature for placing VoIP telephone calls. Speed dial numbers are recorded in a VoIP service provider's database on a server, which is accessible through the Internet from a personal computer (PC) or a conventional telephone. A third aspect of the invention enables callers to complete calls from conventional telephones to personal computers connected to the Internet. The VoIP network detects a flag such as leading "0," determines that the call recipient station is a personal computer, looks up the IP address of the PC and routes the call to the PC.

19 Claims, 9 Drawing Sheets

METHOD AND SYSTEM FOR ROUTING CALLS FROM A STANDARD TELEPHONE DEVICE TO A VOICE OVER INTERNET PROTOCOL NETWORK

This application claims the priority of U.S. provisional application No. 60/193,049 filed on Mar. 29, 2000.

FIELD OF THE INVENTION

This invention relates generally to telephone systems, and more particularly to using a standard telephone to access a Voice over Internet Protocol (VoIP) network.

BACKGROUND OF THE INVENTION

When making a telephone call over a conventional Public Switched Telephone Network (PSTN), a caller uses a touch-tone telephone keypad to enter a telephone number typically consisting of eleven digits for a long distance call within the United States, or other numbers of digits in some foreign countries, which identify the call recipient. Using the number entered, the PSTN identifies the caller, sets up the telephone connection, manages the call and charges the call to the caller's or subscriber's account. The PSTN identifies the caller by identifying the telephone line used to make the call, which is assigned to a specific subscriber. However, in Internet telephony systems, callers typically are not identified by the line they call from, so they must supply this information to make VoIP telephone calls.

In order to supply account information before a telephone call can be made over a VoIP network, callers have been required to input a long series of digits by a procedure as for example illustrated in FIG. 1A. A conventional telephone handset is picked up to initiate a VoIP call. In step 110 the caller uses the telephone keypad or a computer keyboard to enter an access number of an Internet calling service, which could be a local number or a toll free national access number. Typically, in the U.S. this is an eleven digit telephone number such as 1-800-555-1234. Once a connection is established to the service, the caller in step 120 enters an account number of, say, eleven digits, followed in step 130 by entering a personal identification number (PIN) of, say, four digits. Finally, in step 140, the caller enters the desired recipient's eleven digit (or other length, depending on the country,) telephone number. This method of making a VoIP call from a regular telephone requires callers to enter a total of approximately thirty-seven digits.

Callers accustomed to making conventional telephone calls by entering eleven digits view entering thirty-seven digits as tedious and are discouraged from using VoIP networks to make telephone calls. Therefore, a method of reducing the number of digits that are entered when placing a VoIP telephone call is needed.

Auto dialers, as shown in FIG. 1B, have been used to address the task of repeatedly transmitting strings of digits. VoIP telephone calls have the problem that only the portion of the string corresponding to the network access number, account number and PIN number is the same for all calls through a given service provider, whereas the portion corresponding to the recipient's telephone number differs for each recipient. Although auto dialer 150 has the ability to store and transmit programmed strings of digits, it does not have the flexibility to automatically modify an existing string of VoIP logon digits by appending a different telephone number string for each call recipient. It would be inefficient to have the caller program the auto dialer with the same logon string and a different telephone number string for every new call made. Also, the storage capacity of auto dialers is finite and incrementally costly.

Furthermore, when making a VoIP telephone call it is insufficient to transmit just a string of numbers and be done. Often the caller must transmit some digits, wait for a handshake signal from the IP network, transmit the next set of digits, and so on, until a connection is established. A conventional auto dialer 150 does not have the ability to interact with a communications network in this smart fashion. Therefore, there is a need for a smart auto dialer which can automatically modify a string of digits according to a user's input, transmit that string of digits and interact with the communications network to establish communications.

SUMMARY OF THE INVENTION

The present invention provides a method for accessing and using a Voice over Internet Protocol network, and includes a process and a device for using a standard telephone to automatically access a VoIP network.

A first aspect of the invention uses an auto dialer to transmit digits, such as a network access number, an account number and a PIN, which remain unchanged from call to call made through a given network service provider. A caller will enter the telephone number of the call recipient and the invention will automatically dial the network access number, account number and PIN, and assist the caller in making the connection. Thus, the invention automatically performs the cumbersome tasks of logging onto, and gaining access to, a network so that the caller does not have to. This enables the caller to then type in only the typically eleven digit telephone number of the call recipient, as would be done using a conventional telephone with a Local Exchange Carrier (LEC). This makes VoIP telephone calls as convenient to place as normal telephone calls and hence more appealing to the average consumer.

A second aspect of the invention provides a speed dial feature for placing VoIP telephone calls. Speed dial numbers are recorded in a VoIP service provider's database on a server, which is accessible through the Internet from a personal computer (PC) or a conventional telephone. Each telephone number to be called is assigned an identification number consisting of as few digits as possible as determined by the number of entries in the database for a given subscriber. If the database consists of one to ten entries then one digit is needed, eleven to one hundred entries then two digits are needed, etc. The subscriber can use a PC or a telephone to set up the speed dial list in the VoIP service provider's database on the Internet. Once the database is set up the caller takes his or her telephone off-hook, enters the speed dial number followed by an end-marker such as a "#" sign, then uses the auto dialer to outpulse the network access number and log onto the VoIP service provider. The VoIP server retrieves the correct telephone number and facilitates the connection. This feature makes placing VoIP telephone calls as convenient as using conventional telephones or telephone services with speed dial features.

A third aspect of the invention enables callers to complete calls from conventional telephones to personal computers connected to the Internet. The caller first enters a "0" or "00" or other designated equivalent symbol(s), and then enters a series of digits consisting of a conventional-type telephone number associated with a specific PC on a proprietary VoIP service provider's network. The network detects the leading "0" or equivalent symbol, determines that the call recipient station is a PC, looks up the IP address of the PC and routes the call to the PC, thereby establishing a call from a conventional telephone to a PC.

DETAILED DESCRIPTION OF THE PREFERRED EMBODIMENT

The invention provides a system and method for accessing and using a Voice over Internet Protocol network.

Figure 2:
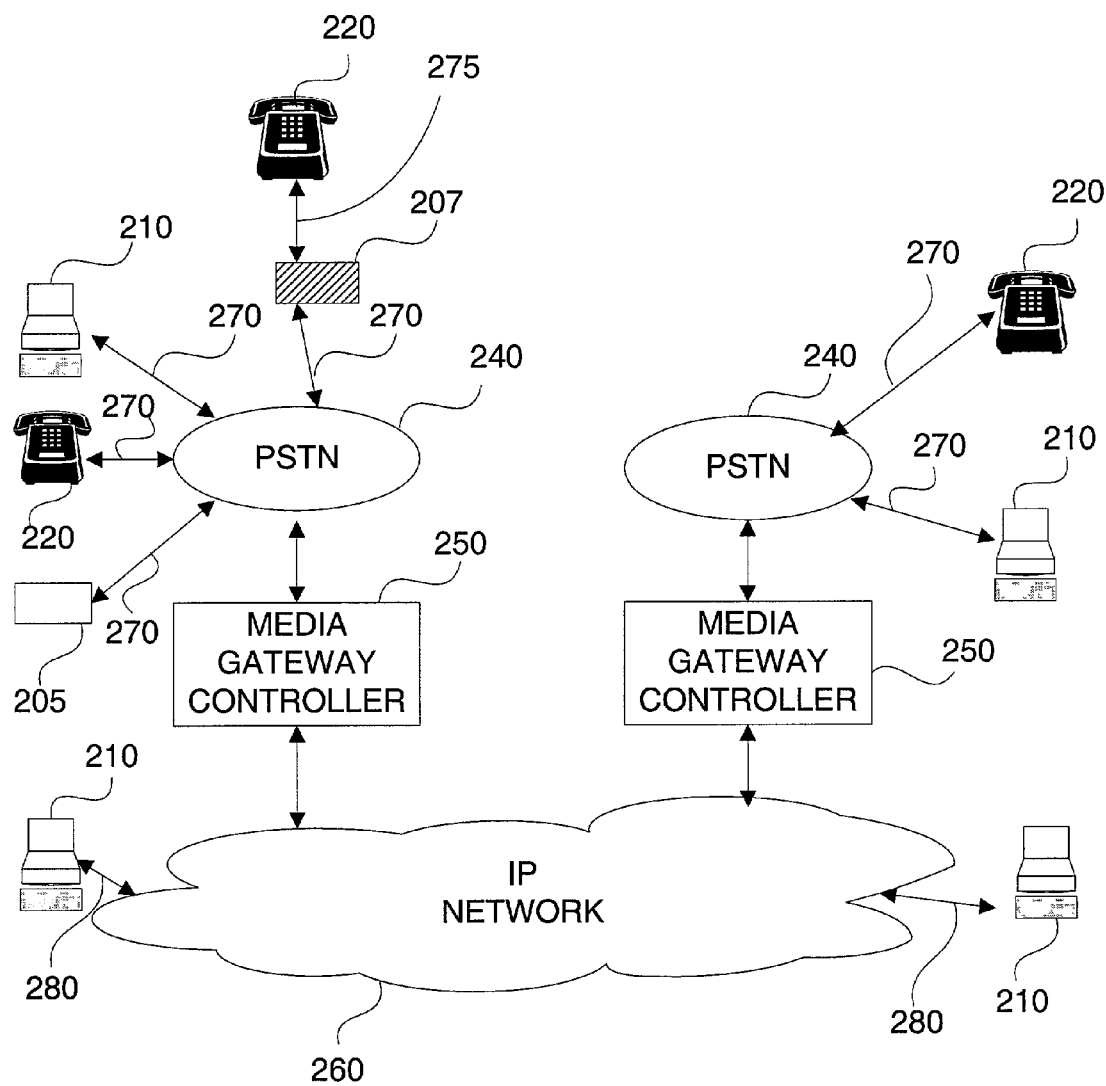
FIG. 2 is a diagram showing the inventive device connected through a VoIP service provider to the Internet.

FIG. 2 shows a first embodiment of the inventive device 205 and a second embodiment of the inventive device 207 as used in an environment of personal computers 210, conventional telephones 220, a Public Switched Telephone Network (PSTN) 240, media gateway controllers 250 operated by VoIP service providers, and an Internet Protocol network 260. Inventive devices 205, 207 and conventional telephones 220 all use conventional telephone lines 270 to interact with a PSTN 240, which interacts with the IP network 260 through a media gateway controller 250. Inventive device 207 also uses a standard telephone cord 275 to connect to a conventional telephone 220. Personal computers 210, however, can interact with the IP network 260 indirectly through conventional telephone lines 270, PSTN 240 and Media Gateway Controller 250 or through a dedicated line connection 280.

Figure 3:
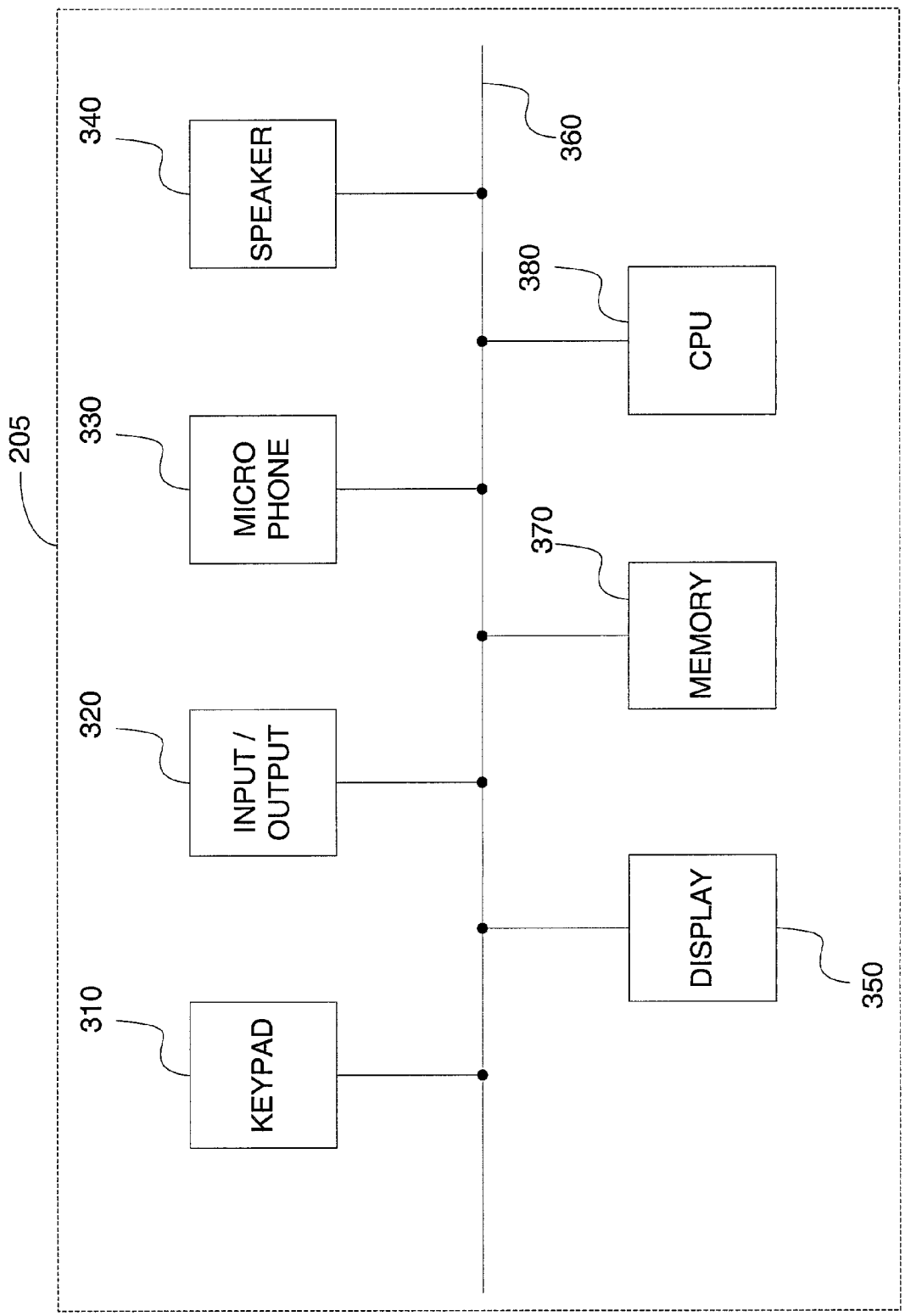
FIG. 3 is a block diagram of the preferred embodiment of the inventive device.

FIG. 3 represents one embodiment of the inventive device 205, which preferably includes a keypad 310, an input/output interface 320 for telephone and fax connections, a microphone 330, a speaker 340, an optional display 350, a bus 360, memory 370 and a Central Processing Unit (CPU) 380. When using device 205 to make a telephone call, the caller first activates the device 205 by either picking up a handset containing microphone 330 and speaker 340 or by pressing a designated key (not shown) on keypad 310. As the caller enters the desired telephone number through keypad 310, the telephone number will be displayed if device 205 has the optional display 350 and saved in memory 370. CPU 380, which has been pre-programmed, then prepares an appropriate series of digits needed to make a VoIP call. CPU 380 supplies this series of digits through bus 360 to the input/output interface 320 which transmits the digits through a telephone line 270. Once a connection is established to a media gateway controller 250 (FIG. 2), CPU 380 facilitates routing signals via bus 360 between the input/output interface 320, microphone 330, speaker 340 and optional display 350 so that the caller can complete the call. The call is terminated when the caller places the device 205 "on hook" by putting down the handset or by pressing a designated key on keypad 310.

An alternative embodiment 207 of the inventive device resides between a conventional telephone 220 and a wall jack which connects to a PSTN 240. Inventive device 207 acts as an accessory which upgrades a conventional telephone to the functional equivalent of inventive device 205. Inventive device 207 has many of the same features as inventive device 205 but lacks the direct user interface capabilities such as the keypad, microphone and speaker. Once inventive device 207 has been set up, it acts like a "black box" and is transparent to the user of the attached conventional telephone 220. This second embodiment allows the caller to utilize the new functionality without buying a new telephone.

Figure 4:
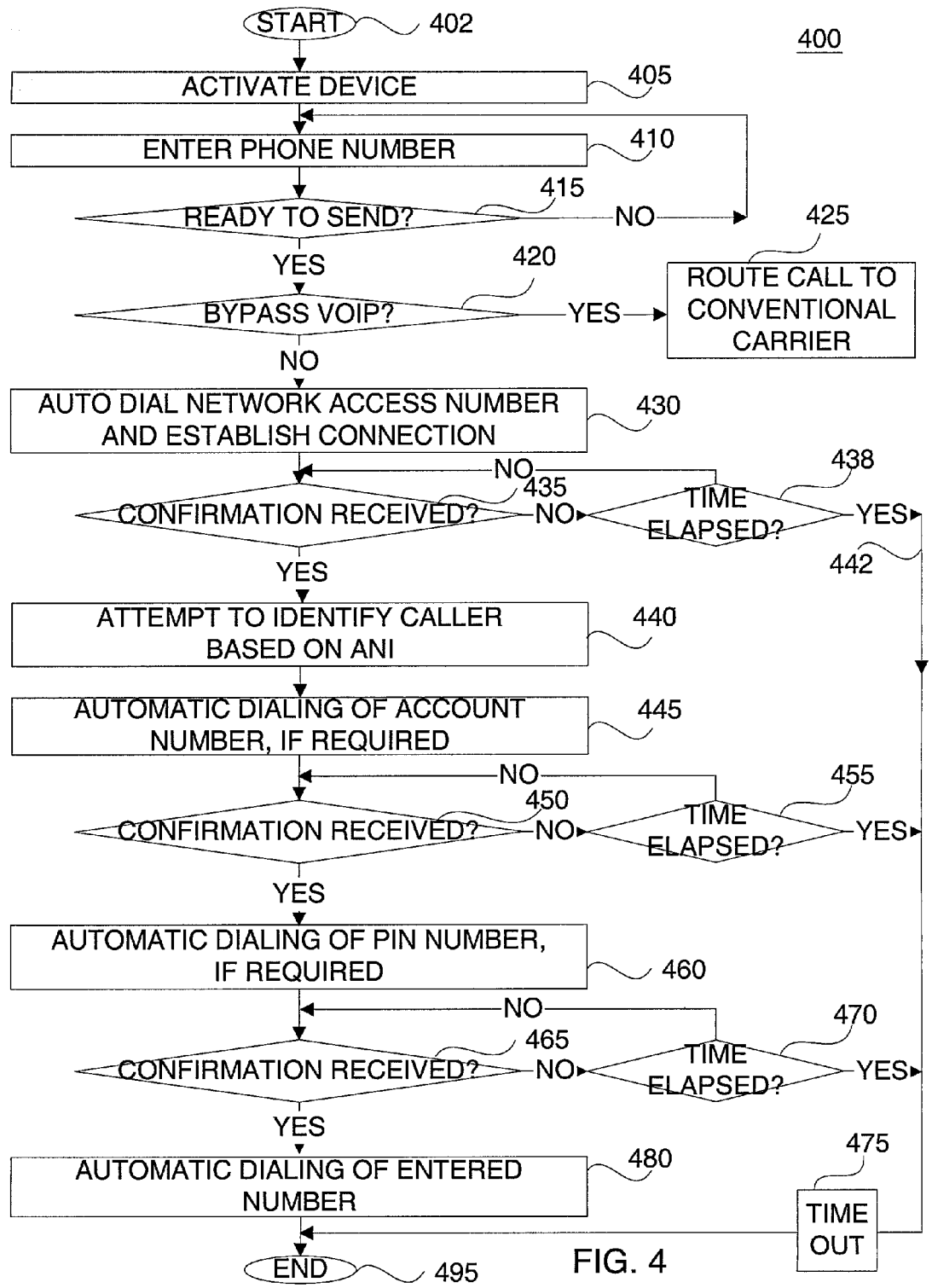
FIG. 4 is a flowchart showing the preferred method of logging onto a VoIP network to make a call.

FIG. 4 is a flowchart showing the preferred method 400 of using the inventive device 205 or 207 to establish communication through a VoIP network 260. The process of placing a call begins with the step 405 of activating the inventive device 205 or 207 followed by the step 410 of entering the desired recipient's telephone number. Before transmitting the entered information the caller in step 415 can confirm that the numbers entered are correct and ready to be sent. If the caller is satisfied with the numbers entered he or she can start the call set-up by step 415 of, for example, pressing a send button. Alternatively, inventive devices 205 and 207 can be configured to automatically set up calls so that the caller does not need to press a send button. This can be done by several methods such as by counting the number of digits entered, or measuring the length of time since the last digit was entered, and at some point concluding that all of the digits have been entered. Before placing the call, the inventive device 205 or 207 in step 420 checks whether to bypass the VoIP network 260 and instead in step 425 use a conventional carrier, or to proceed to step 430 and dial the VoIP network number. As described below, the inventive device can be used as a conventional telephone or be programmed to use a conventional carrier for a defined class of numbers entered.

Figure 1A:
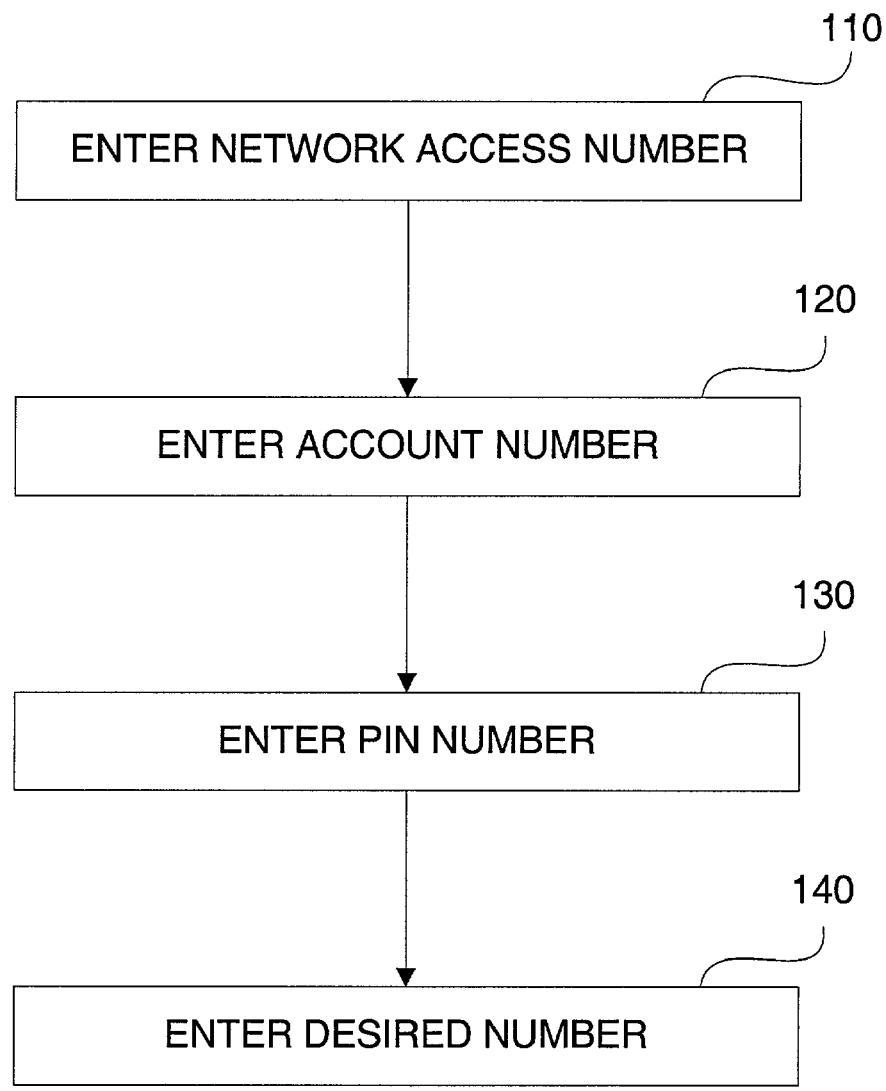
FIG. 1A illustrates a prior art method of entering digits to place a VoIP telephone call.
Figure 1B:
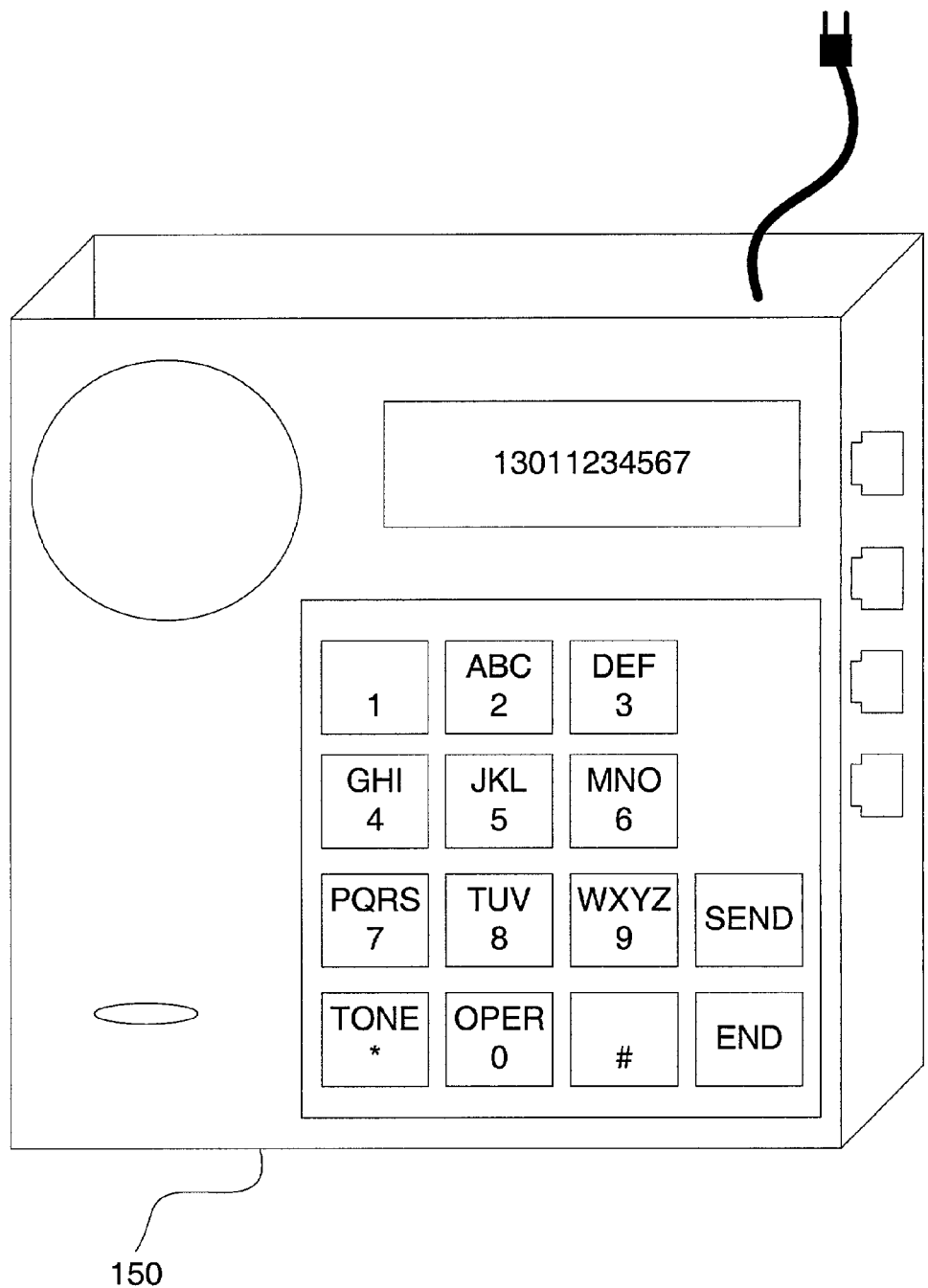
FIG. 1B shows a typical prior art auto dialer.

Upon step 420 determining that the VoIP network 260 is to be used, the inventive device 205 or 207 assembles a string of typically thirty-seven digits, as described in FIG. 1A, that it will transmit. The string of digits preferably includes an eleven digit network access number, an eleven digit account number, a four digit PIN and an eleven digit recipient's telephone number.

Step 430 automatically dials the first eleven digits of this assembled string to gain access to the VoIP network 260. Step 435 checks whether a confirmation (i.e., a dial tone indicating that a communication link has been established between the device and the network) has been received. If not, then step 438 checks to see whether a time-out period (e.g., two minutes) has elapsed. If the time-out has elapsed, the process follows path 442 to step 475 which indicates a time-out error, after which in step 495 the call attempt will end and the user will have to start over from the beginning step 402.

If a confirmation is received before the time-out period has elapsed, then from step 435 the process continues to optional step 440, which checks for an Automatic Number Identification (ANI) (similar to a caller-ID) and, if an ANI is detected, searches the VoIP service provider database in an attempt to identify a subscriber. If the subscriber is identified then either or both of the account number and PIN may be skipped.

Next, if required, step 445 automatically dials the account number, and step 450 checks for a confirmation that the account number has been received. If no confirmation has been received then step 455 checks whether the time-out period has elapsed.

If step 450 receives a confirmation in time, then in step 460 device 205 or 207, if necessary, transmits the PIN. After steps 465 and 470 confirm reception of the PIN, step 480 finally transmits the recipient's telephone number.

The inventive device in embodiment 205 can also be used as a conventional telephone. The FIG. 4 process in step 420 checks if device 205 has been set up to be used as a conventional telephone and if so then in step 425 bypasses the VoIP network in favor of completing telephone calls through a conventional telephone carrier such as Verizon. The VoIP calling capabilities can be disabled by various means such as switching a VoIP disable or enable button, or by typing in a code such as, for example, "99." The inventive device 205 can also be programmed so that some telephone calls are not passed on to the VoIP network 260. For example, the emergency number "911" can be programmed to pass to a conventional carrier. Additionally, the inventive device could be configured to pass all local calls such as calls that do not lead with a "1" (or a "0," according to a third aspect of the invention, described below) to a conventional carrier, or to pass all toll-free calls to a conventional carrier.

Figure 5:
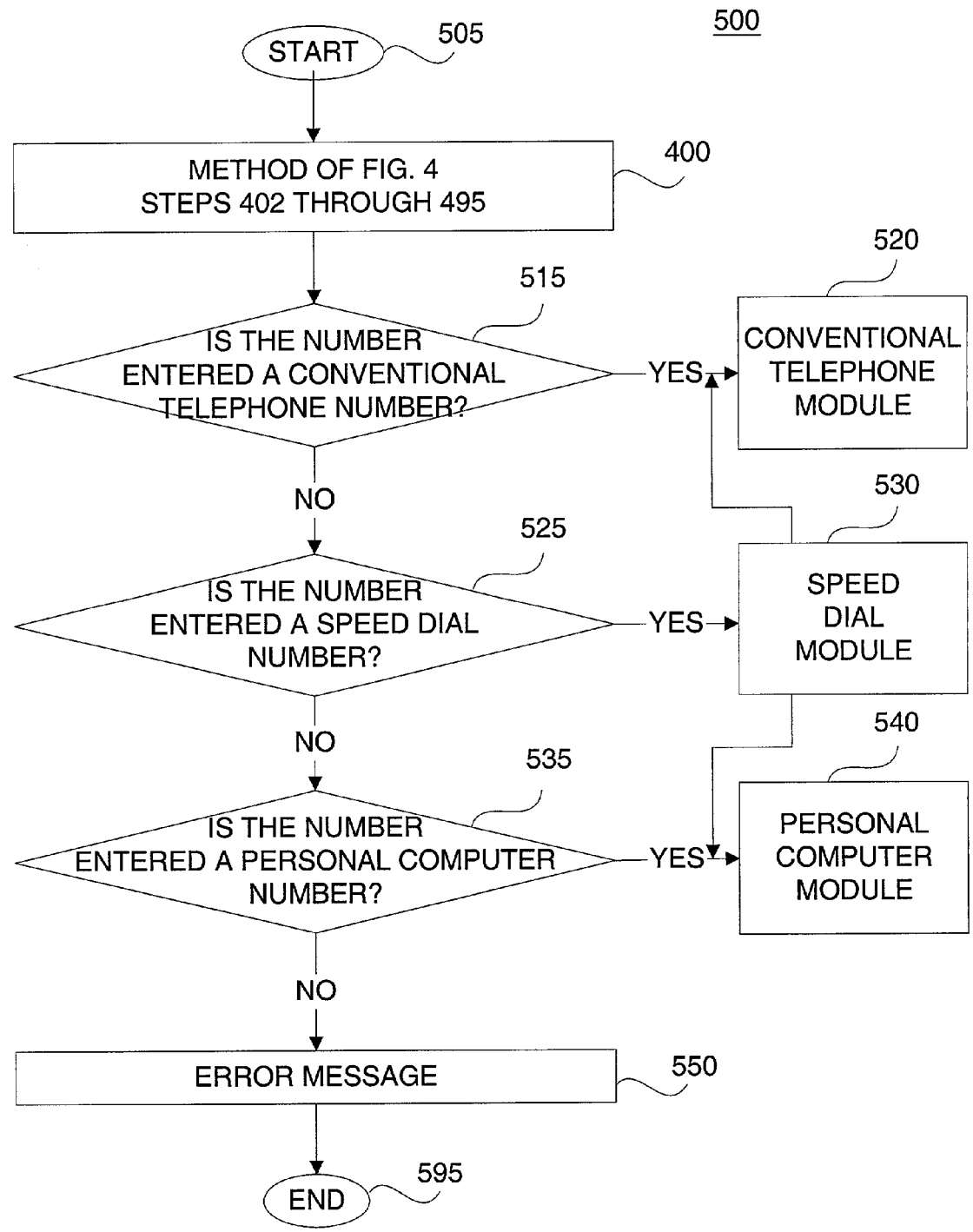
FIG. 5 is a flowchart showing the preferred method of routing a call.

FIG. 5 is a flowchart showing the process 500 of routing a telephone call after the VoIP network has been accessed and the caller logged on. Once the inventive device in FIG. 4 steps 400 has gained access to a VoIP network 260 and dialed the entered destination number, the VoIP service provider's 250 programming determines how to route the call. Each VoIP network service provider such as, for example, ZeroPlus.com of Germantown Md., will have proprietary, unique programming and the inventive device 205 or 207 may have to be configured differently for each VoIP service provider that a caller may plan to use.

In step 515 the VoIP service provider checks if the telephone number entered in step 410 is a conventional telephone number. If so, then in step 520 the call is routed to a conventional telephone module which manages the call as a normal VoIP network call.

Alternatively, if the telephone number entered in step 410 is not a conventional number then the VoIP service provider 250 in step 525 checks if it is a speed dial number. The VoIP service provider architecture 250 is preferably designed to recognize speed dial numbers by looking for a marker such as "#" sign at the end of the numbers. If the number entered is a speed dial number then in step 530 the call is routed to a speed dial module which manages the call as described in FIG. 6.

The VoIP service provider next in step 535 checks if the telephone number entered in step 410 is a personal computer number. According to the third aspect of the invention, the VoIP service provider's network architecture is preferably designed to recognize a PC-based telephone number based on a marker such as a "0" or "00" at the beginning of an otherwise conventional-type telephone number. If the number entered is recognized to be a personal computer number then in step 540 the call is routed to a personal computer module which manages the call as described in FIG. 7.

The FIG. 5 sequence of checking the routing is not essential and can be done in any order.

If at this point in the process flow the call has not been routed then presumably there is a problem with the telephone number entered and step 550 returns an error message such as "Not a valid number," or possibly connects the caller to an operator.

The second aspect of the invention, a speed dial feature, allows users to make VoIP network calls similarly to the way speed dial is used with conventional telephones. When using the speed dial feature the caller is only required in FIG. 4 step 405 to pick up the telephone and in step 410 dial several digits, which can be as few as one digit, and then enter the "#" sign. The inventive device 205 or 207 automatically accesses the network as described in FIG. 4 and then, in step 525, proceeds to step 530, which uses the "#" sign as a flag to signal the network that speed dial is requested.

Figure 6:
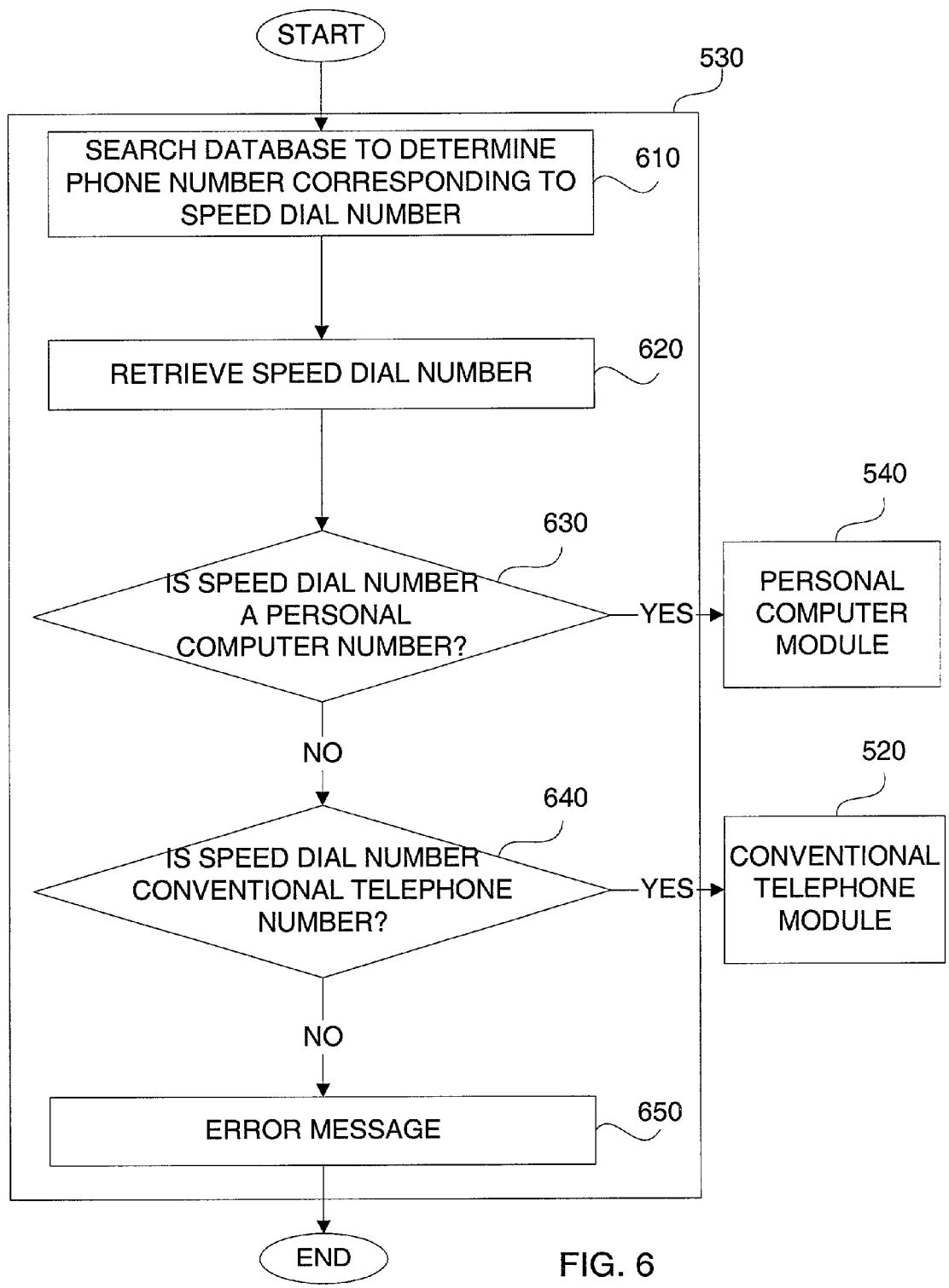
FIG. 6 is a flowchart showing specifics of step 530 of FIG. 5.

FIG. 6 details the process flow performed by the speed dial module in step 530. Once the service provider has been alerted that speed dial is requested, in step 610 the provider searches a database that is associated with the user's account to find the telephone number corresponding to the speed dial number and in step 620 retrieves that corresponding number. Step 630 checks to determine if the retrieved number is a personal computer number and if so, step 540 routes the call to the personal computer module as described in FIG. 7. If the retrieved number is not a personal computer number, then step 640 checks to determine if it is a conventional telephone number. If the retrieved number is a conventional telephone number then step 520 routes the call to the conventional telephone module shown in FIG. 5. Finally, if the retrieved number is not routed to either of these modules then step 650 returns an error message consisting of information such as "Not a valid speed dial number" or possibly connects the caller to an operator.

Figure 7:
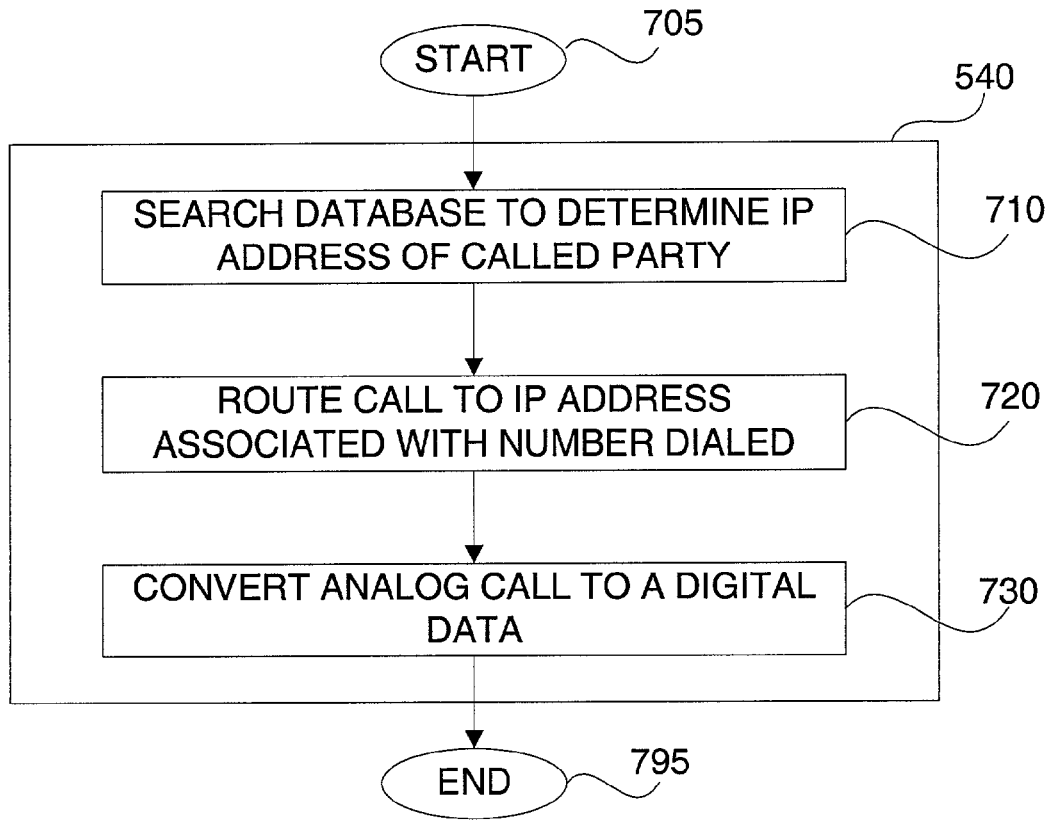
FIG. 7 is a flowchart showing specifics of step 540 of FIG. 5.

FIG. 7 details the process flow performed by the personal computer module in step 540. A call is routed to the personal computer module when the VoIP service provider in step 530 or in step 535 determines that the desired telephone number entered in step 410 is that of a personal computer 210. With this process it is possible to make a telephone call from a conventional telephone to a personal computer 210 which is connected to the Internet 260. The conventional telephone to personal computer call begins by first gaining access to the Internet telephone service provider's network and server as described in FIG. 4. Once a connection is established and the user is logged onto a server, the auto dialer in step 480 transmits the number entered by the caller. The service provider in step 535 checks if the number dialed is a computer number. If the number dialed belongs to a computer the service provider in step 710 accesses a database and looks up the IP address of the computer 210 being called, and in step 720 routes the call to, and contacts, that computer. Once a connection is made the service provider manages the call in step 730 by converting the analog call signal to digital data signals and vice-versa so that the caller and the called computer can communicate.

Figure 8:
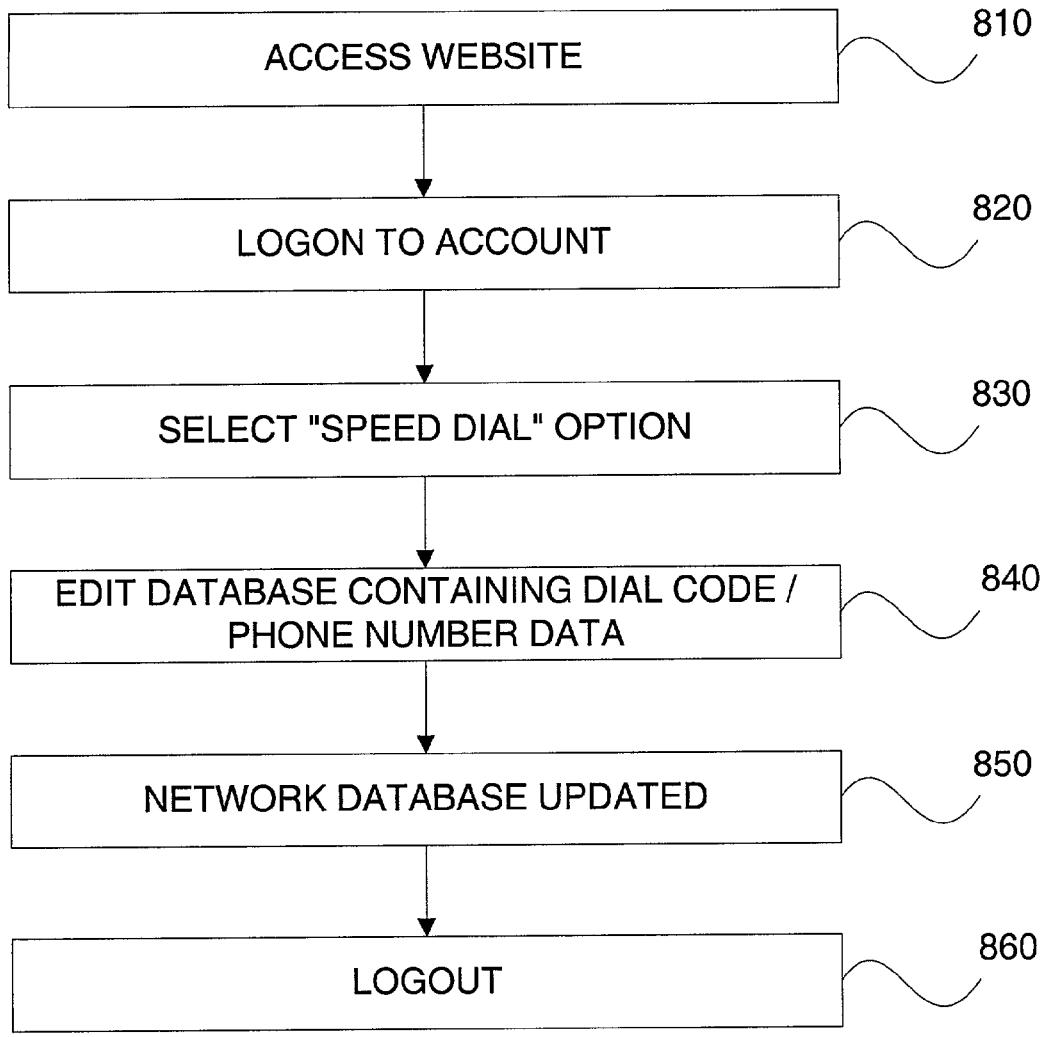
FIG. 8 is a flowchart showing the preferred method of updating the speed dial database used in step 610 of FIG. 6.

FIG. 8 is a flowchart showing the procedure 800 for updating the speed dial database used in step 710. The speed dial set up process 800 begins with step 810 of accessing the website by using an electronic device, such as a computer, and going to a designated website such as, for example, http://www.zeroplus.com, or by using a telephone and calling a telephone number which connects the user to a website. Once the user has accessed the website, in step 820 he/she can enter an account number and a password to logon to a specific account. The account number can be any number of digits but is typically eleven digits. Similarly, the password can be any number of digits but is usually four digits. In step 830 the "speed dial" database can be selected and in step 840 the database can be edited by either adding, deleting or modifying existing entries. If in step 810 access to the website is through an electronic device such as a computer, the "speed dial" list can be changed by following the written instructions on the website, whereas if access is through a telephone then the changes can be made by following voice instructions. The database will consist of at least the speed dial number and the telephone number. In step 840 the changes made to the database can be saved. Once the database has been edited, the user in step 850 can log out.

While the invention has been described in terms of preferred embodiments, modifications of these embodiments will be apparent to those skilled in the art. The invention is limited only by the scope of the following claims.

I claim:

1. A method of making a VoIP (Voice over Internet Protocol) network call from a telephone to an electronic device, the method comprising:
    entering a first number associated with said electronic device, said first number including a telephone number;
    determining, based at least in part on an indication contained in said first number, whether said telephone number corresponds to a computer, said indication being distinct from said telephone number;
    when it is determined that said telephone number corresponds to a computer, determining an IP address corresponding to said computer; and then
    establishing a communication link between said telephone and said computer.

2. The method of claim 1 further comprising of accessing a VoIP network.

3. The method of claim 1 wherein said IP address is retrieved from a database on a network.

4. The method of claim 1 wherein said indication comprises a marker at the beginning of said first number.

5. The method of claim 4 wherein said marker is in front of a conventional telephone number.

6. The method of claim 5 wherein the marker comprises a series of one or more zeros.

7. The method of claim 5 wherein said conventional telephone number is an eleven digit telephone number.

8. The method of claim 1 wherein the call is made from a conventional telephone.

9. The method of claim 8, further comprising:
    converting analog call signals from the telephone into corresponding digital data signals, and
    providing the digital data signals to the computer.

10. The method of claim 9 further comprising:
    converting digital data signals from the computer into corresponding analog signals; and
    providing the corresponding analog call signals to the telephone.

11. A method of making a VoIP (Voice over Internet Protocol) network call from a conventional telephone, the method comprising:
    at the conventional telephone, entering an alphanumeric string;
    determining, based at least in part on an indication contained in said alphanumeric string, whether a part of said string corresponds to a telephone number of a computer, said indication being distinct from said telephone number;
    based at least in part on said determining, determining an IP address corresponding to said computer; and then
    establishing a communication link between said telephone and said computer.

12. The method of claim 11 wherein said indication comprises a marker at the beginning of said alphanumeric string.

13. The method of claim 12 wherein said marker is before the beginning of a conventional telephone number.

14. The method of claim 13 wherein said conventional telephone number is an eleven digit number.

15. The method of claim 12 wherein the marker comprises a series of one or more zeros.

16. A method of making a VoIP (Voice over Internet Protocol) network call from a conventional telephone, the method comprising:
    at the conventional telephone, entering an alphanumeric string;
    determining whether said alphanumeric string corresponds to a speed dial number;
    when it is determined that said alphanumeric string corresponds to a speed dial number, retrieving said speed dial number;
    determining, based at least in part on an indication contained in said speed dial number, whether said speed dial number corresponds to a telephone number of a computer, said indication being distinct from said telephone number;
    when said speed dial number corresponds to a telephone number of a computer, determining an IP address corresponding to said computer; and
    establishing a communication link between said telephone and said computer.

17. The method of claim 16 wherein said indication contained in said speed dial number comprises a marker at the beginning of said speed dial number.

18. The method of claim 17 wherein said marker is before an conventional telephone number.

19. The method of claim 18 wherein the marker comprises a series of one or more zeros.

* * * * *